United States Patent
Langford et al.

(10) Patent No.: US 7,230,980 B2
(45) Date of Patent: Jun. 12, 2007

(54) METHOD AND APPARATUS FOR IMPULSE RADIO TRANSCEIVER CALIBRATION

(75) Inventors: David W. Langford, Madison, AL (US); Dennis L. Troutman, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 652 days.

(21) Appl. No.: 10/245,222

(22) Filed: Sep. 17, 2002

(65) Prior Publication Data

US 2003/0076879 A1    Apr. 24, 2003

Related U.S. Application Data

(60) Provisional application No. 60/322,689, filed on Sep. 17, 2001.

(51) Int. Cl.
   *H04B 1/38*    (2006.01)
   *H04L 5/16*    (2006.01)

(52) U.S. Cl. .................. 375/219; 375/340; 375/342; 375/349; 375/358; 702/97; 702/94

(58) Field of Classification Search .......... 375/219, 375/340, 342, 349, 358; 702/97, 94, 150, 702/158, 159
   See application file for complete search history.

(56) References Cited

U.S. PATENT DOCUMENTS

| | | | | |
|---|---|---|---|---|
| 3,693,080 A | | 9/1972 | Ross et al. .............. 324/58.5 A |
| 3,790,943 A | * | 2/1974 | Pickles et al. .............. 342/399 |
| 3,812,423 A | | 5/1974 | Cronson et al. ........ 324/58.5 A |
| 3,903,477 A | | 9/1975 | Cronson et al. ........ 324/58.5 A |
| 4,641,317 A | | 2/1987 | Fullerton ........................ 375/1 |
| 4,743,906 A | | 5/1988 | Fullerton ..................... 342/27 |
| 5,912,644 A | * | 6/1999 | Wang .......................... 342/457 |
| 6,239,741 B1 | * | 5/2001 | Fontana et al. ............. 342/135 |
| 6,535,161 B1 | * | 3/2003 | McEwan .................... 342/124 |
| 6,762,712 B2 | * | 7/2004 | Kim .......................... 342/135 |
| 2002/0172307 A1 | * | 11/2002 | Sandberg .................... 375/344 |

* cited by examiner

Primary Examiner—Chieh M. Fan
Assistant Examiner—Anna Ziskind
(74) Attorney, Agent, or Firm—James Richards

(57) ABSTRACT

A method for calibrating an impulse radio distance measuring system comprising an impulse radio transceiver by conducting a pulse through a transmit receive switch to an antenna, receiving return energy which has been discharged across the transmit receive switch, determining a time of arrival of the return energy. The return energy is comprised of two distinct pulses, one of which represents discharge of the transmit switch as the original pulse travels to the antenna, the second represents energy reflected from the antenna and again discharged across the transmit receive switch while the switch is in the transmit position. The timing of the un-reflected energy is determined then the timing of the reflected energy relative to the un-reflected energy is determined through auto-correlation of the time domain scan of the received composite waveforms.

13 Claims, 17 Drawing Sheets

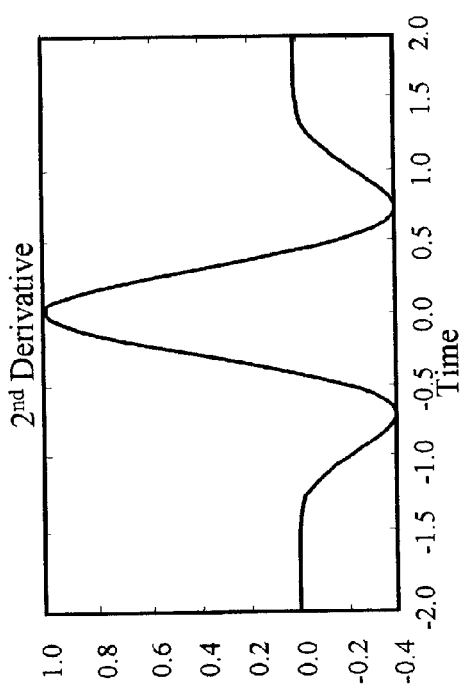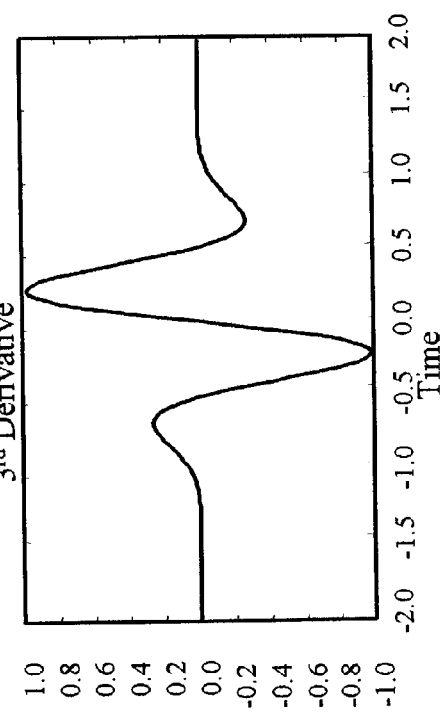
FIG. 1C
FIG. 1D

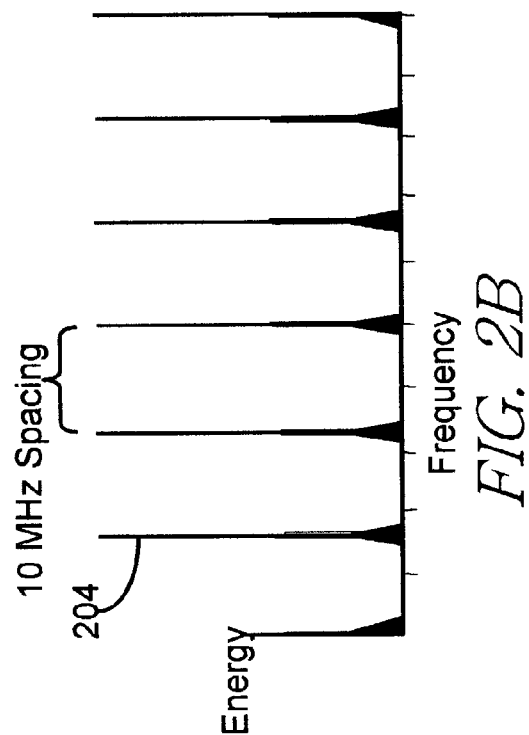
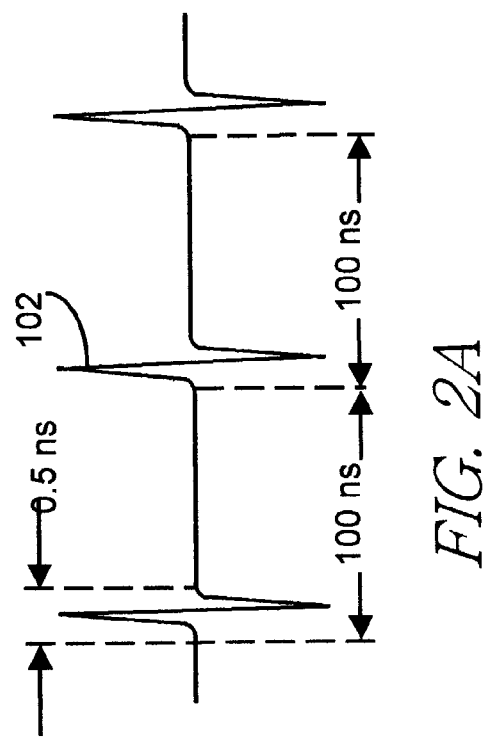
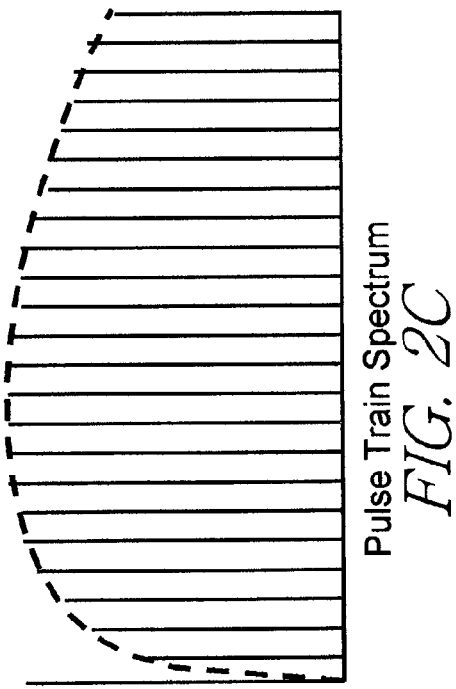
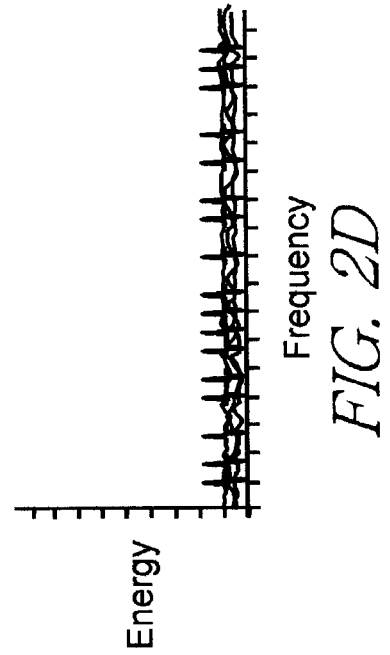
FIG. 2A
FIG. 2B
FIG. 2C
Pulse Train Spectrum
FIG. 2D

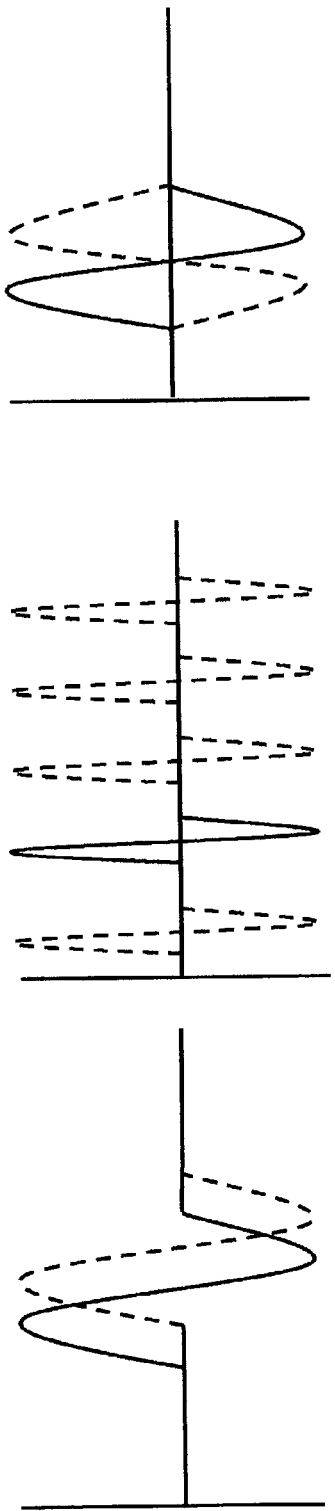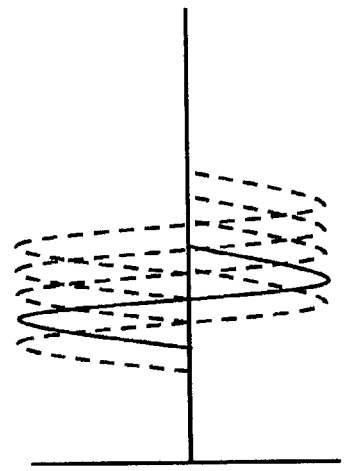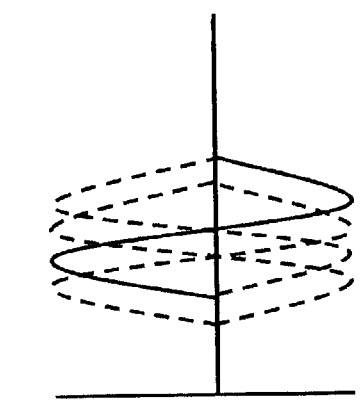
FIG. 4A Early-Late Modulation
FIG. 4B One of Many Modulation
FIG. 4C Flip Modulation
FIG. 4D Quad Flip Modulation
FIG. 4E Vector Modulation

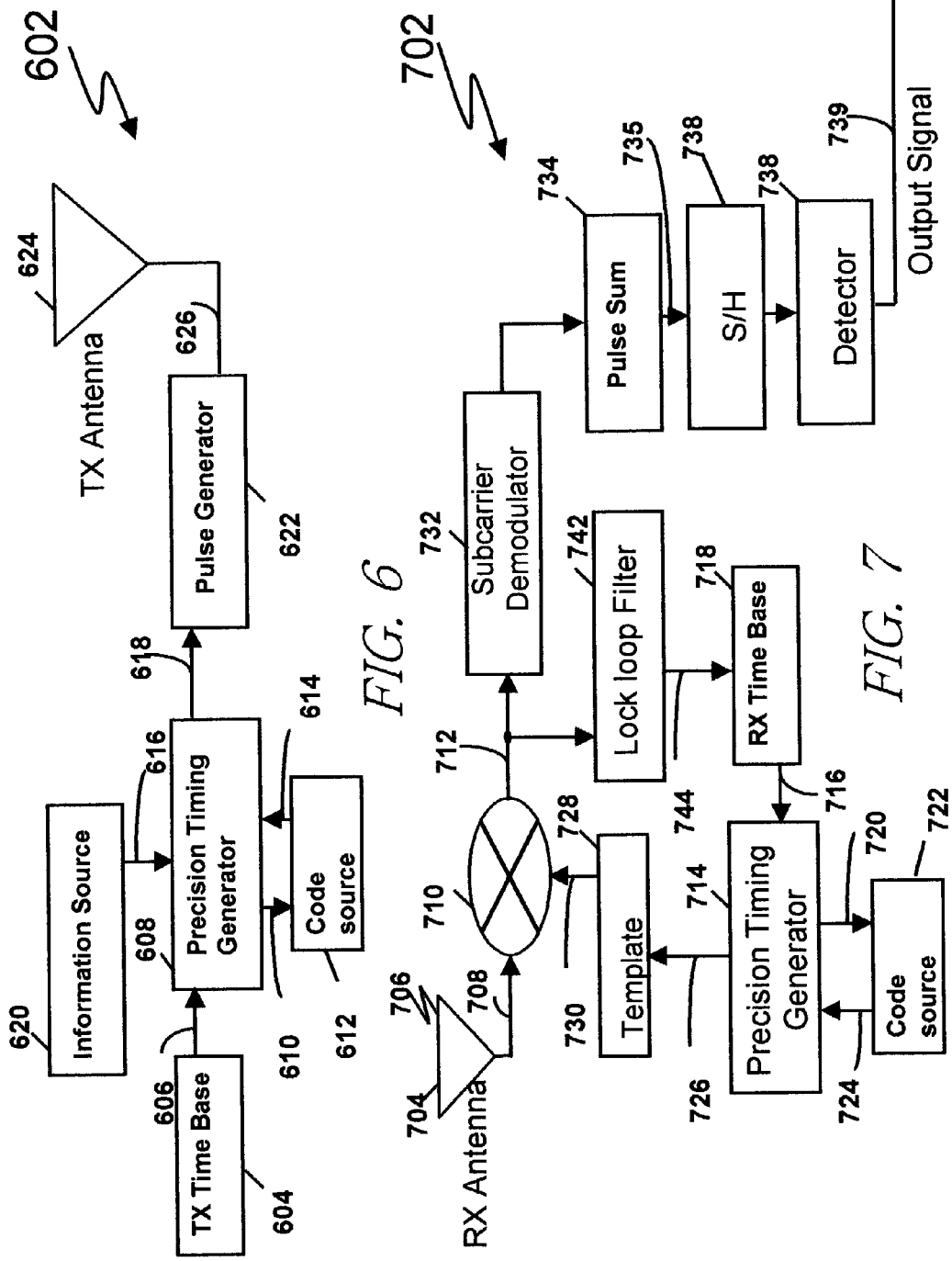

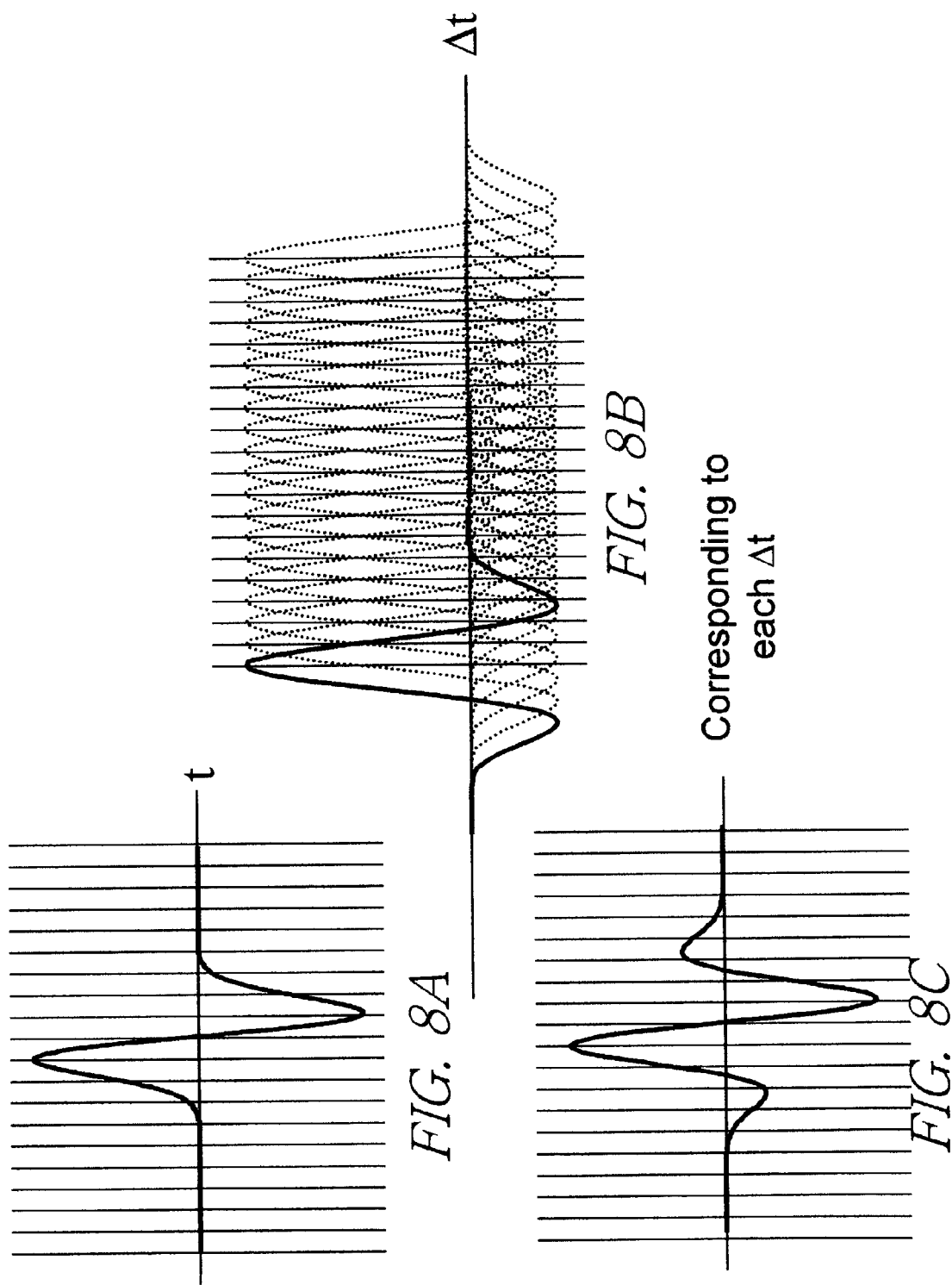

METHOD AND APPARATUS FOR IMPULSE RADIO TRANSCEIVER CALIBRATION

CROSS-REFERENCE TO RELATED APPLICATIONS

Priority to Provisional Application Ser. No. 60/322,689, filed Sep. 17, 2001, is hereby claimed.

BACKGROUND

In recent years, modern communications technology has provided various systems for position determination. The global positioning system (GPS) operated by the United States Department of Defense, for example, is a highly complex system of determining the position of an object. The GPS system depends on measuring the time-of-flight of microwave signals from three or more orbiting satellite transmitters by a navigation receiver that computes the position of the mobile unit. According to the GPS system, each satellite broadcasts a time-stamped signal that includes the satellite's ephemeris, i.e., its own position. When the mobile unit receives a GPS signal, the mobile unit measures the transmission delay relative to its own clock and determines the pseudo-range to the transmitting satellite's position. The GPS system requires three satellites for two-dimensional positioning, and a fourth satellite for three-dimensional positioning.

Another approach is that employed by the U.S. Navy's TRANSIT system. In that system, a mobile unit performs continuous doppler measurements of a signal broadcast by a low earth orbit (LEO) satellite. The measurements continue for several minutes. The system usually requires two passes of the satellite, necessitating a wait of more than 100 minutes. In addition, because the position calculations are performed by the mobile unit, the satellite must broadcast information regarding its position, i.e., its ephemeris. Although the TRANSIT system is capable of high accuracy (on the order of one meter), the delay required is unacceptable for commercial applications.

Although these systems accurately determine the unknown position of an object, they are extremely complex, and, more importantly, expensive to implement. For example, both the GPS and TRANSIT systems require multiple satellites, sophisticated receivers and antennas that require hundreds of millions dollars of investments. Also, response times of GPS and TRANSIT systems are typically slow due to their narrow bandwidth. Furthermore, since these systems depend on orbiting satellites, they require an unimpeded view of the sky to operate effectively.

There is a great need in many different fields for a simple, less expensive alternative to complicated position determination systems. One such area is a typical shipping terminal, e.g., a major sea-port or an airport. In a sea-port, containers having valuable cargo are stored at warehouses or are left in designated places in the terminals. Also, containers are sometimes moved from one section of the port to another section in preparation for their eventual loading into a cargo ship or being picked up by trucks or railcars after being unloaded from a cargo ship. Often it is necessary to determine the location of one or more containers. However, it is difficult to identify one or more containers among hundreds, or thousands of containers in a terminal. Similar problems are also encountered in airports and railway terminals where containers are kept in storage sites.

A simple, less expensive position determination system is also desirable for locating police units. Such a position determination system can be used as a vehicle locator system. A city dispatcher would be able to quickly and efficiently dispatch police units if the dispatcher has pre-existing knowledge of each unit's locations. Currently city dispatchers use mobile phones to communicate with police units in order to know their locations. However, using mobile phones to determine the positions of the police units has some disadvantages. Use of mobile phones is expensive and time consuming. Also, when a police officer is not in the car, it is not possible to determine the unit's location.

Recently, the FCC has mandated that all cell phone systems implement position determination for use in emergency call location. In addition, there is a need for position determination as part of cell phone security, fraudulent use, and zone handoff algorithms. These requirements are difficult to meet and GPS is not adequate to reliably deliver the required accuracy.

Systems comprised of two or more radio transceivers have been developed which are intended to locate and track objects within the scope or zone of the system, including other transceivers. Necessary to this function is the capability of the transceivers to accurately measure distance, whether it is the distance to the object being tracked or distance to another transceiver. However, the distances measured typically only take into account the distance from the antenna of one radio to the antenna of the other radio while the actual distance of the transmitter of the signal from the antenna may be greater, thus making distance determination inaccurate. Even distances of signal travel within the transceiver circuitry can be as much as forty feet. Compounding this error is the fact that as the circuitry warms, signal time of flight through circuitry may increase due to reaction of the circuitry to heat.

Known in the art is the technique of time domain reflectometry (TDR) which typically measures the length of a wire by sending a pulse down the wire and timing the arrival of the reflection. In this manner, one is able to pinpoint breaks in underground cable, for example. However, to applicant's knowledge this technique has not been used to determine distance of the internal circuitry in a transceiver apparatus because reception of energy while the transceiver is transmitting has been blocked by use of a transmit receive switch. Typically, transmit receive switches protect receive circuitry from the power associated with signal transmission in order to prevent "blinding" the receiver to incoming signals. This has prevented use of TDR to measure internal transceiver circuitry.

Thus, a system and method is needed to enhance the accuracy of positioning systems and to provide feedback and re-calibration in case of measurement drift due to temperature variations.

SUMMARY OF THE INVENTION

Described herein is a method for calibrating an impulse radio distance measuring system comprising an impulse radio transceiver by conducting a pulse through a transmit receive switch to an antenna, receiving return energy which has been discharged across the transmit receive switch, determining a time of arrival of the return energy, and converting the time of arrival to a distance.

In another embodiment, the return energy is comprised of two distinct pulses, one of which represents discharge of the transmit switch as the original pulse travels to the antenna, the second represents energy reflected from the antenna and again discharged across the transmit receive switch while the switch is in the transmit position. The timing of the un-reflected energy is determined then the timing of the reflected energy relative to the un-reflected energy is determined through auto-correlation of the time domain scan of the received composite waveforms.

A system using the above-described method comprises a control processor for timing functions and calculation, a pulser, a transmit receive switch, an antenna and a receiver capable of detecting such pulses.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1C represents the second derivative of the Gaussian Monocycle of FIG. 1A;

FIG. 1D represents the third derivative of the Gaussian Monocycle of FIG. 1A;

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

FIG. 4A–4E illustrate five modulation techniques to include: Early-Late Modulation; One of Many Modulation; Flip Modulation; Quad Flip Modulation; and Vector Modulation;

FIG. 6 illustrates a representative impulse radio transmitter functional diagram;

FIG. 7 illustrates a representative impulse radio receiver functional diagram;

FIG. 8A illustrates a representative received pulse signal at the input to the correlator;

FIG. 8B illustrates a sequence of representative impulse signals in the correlation process;

FIG. 8C illustrates the output of the correlator for each of the time offsets of FIG. 8B.

DESCRIPTION OF THE EMBODIMENTS

Overview of the Invention

Figure 1B:
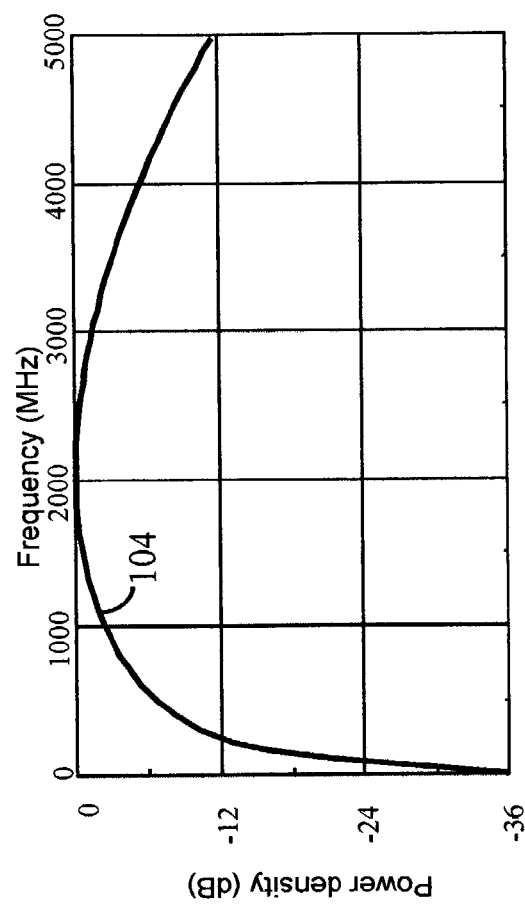
FIG. 1B illustrates the frequency domain amplitude of the Gaussian Monocycle of FIG. 1A.
Figure 1A:
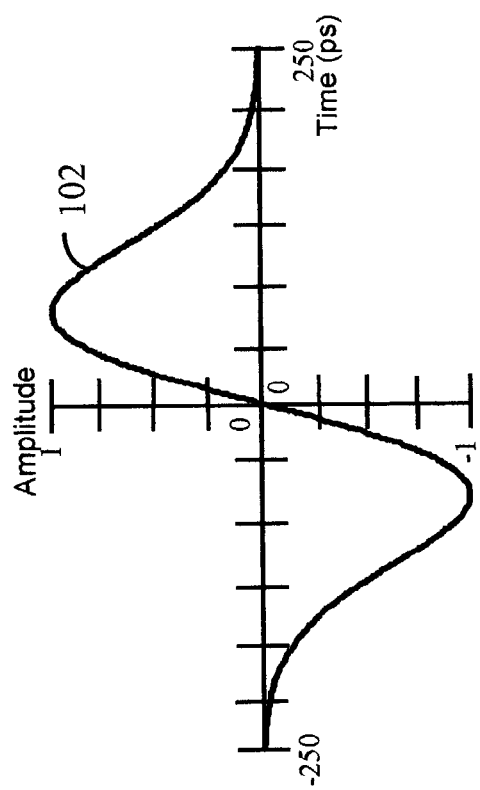
FIG. 1A illustrates a representative Gaussian Monocycle waveform in the time domain.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Technology Overview

Recent advances in communications technology have enabled ultra wideband technology (UWB) or impulse radio communications systems "impulse radio". To better understand the benefits of impulse radio to the present invention, the following review of impulse radio follows. Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. patent application Ser. No. 09/332,502, titled, "System and Method for Intrusion Detection using a Time Domain Radar Array" and U.S. patent application Ser. No. 09/332,503, titled, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
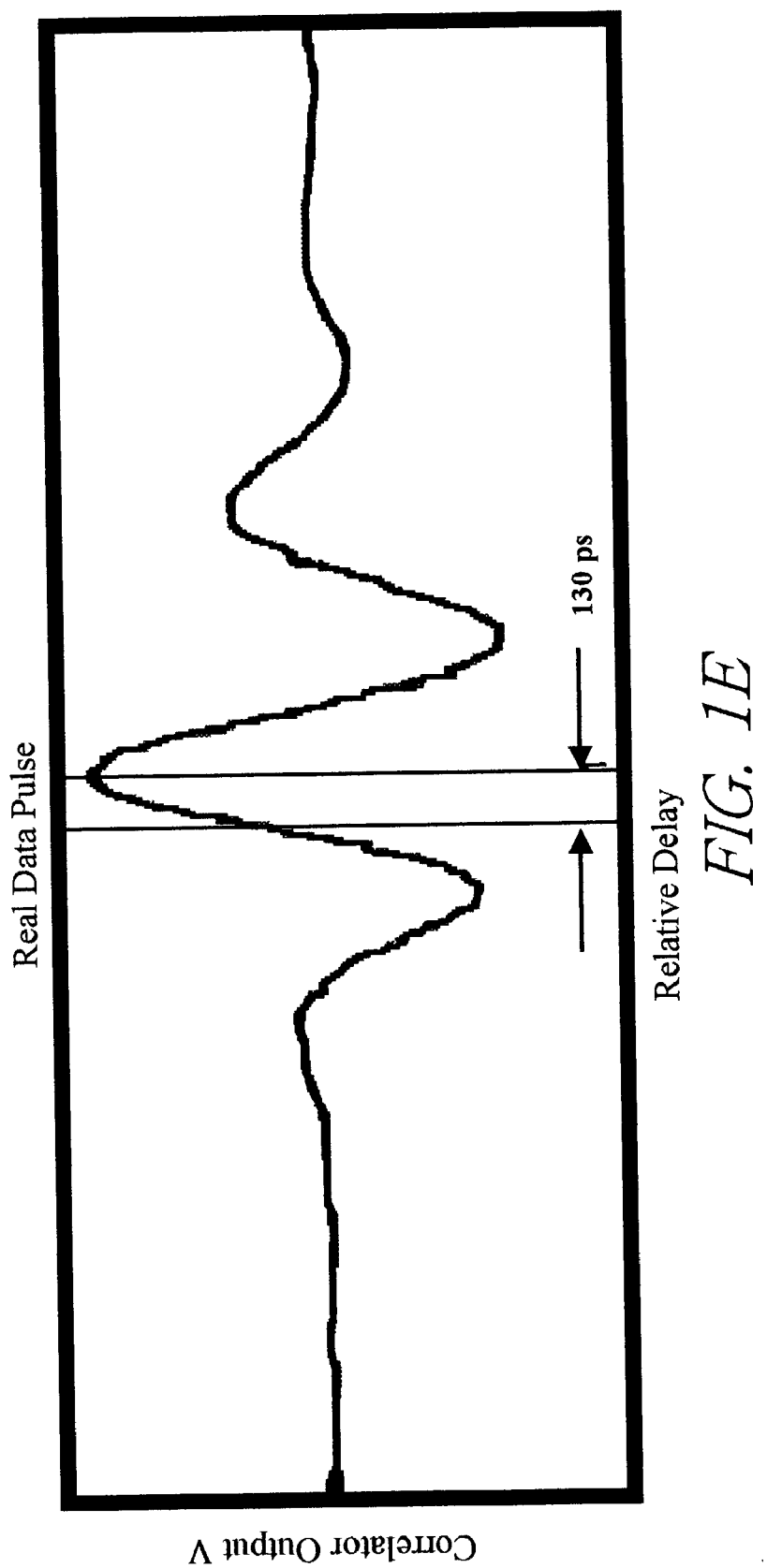
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where $\sigma$ is a time scaling parameter, t is time, and e is the natural logarithm base.

Figure 1F:
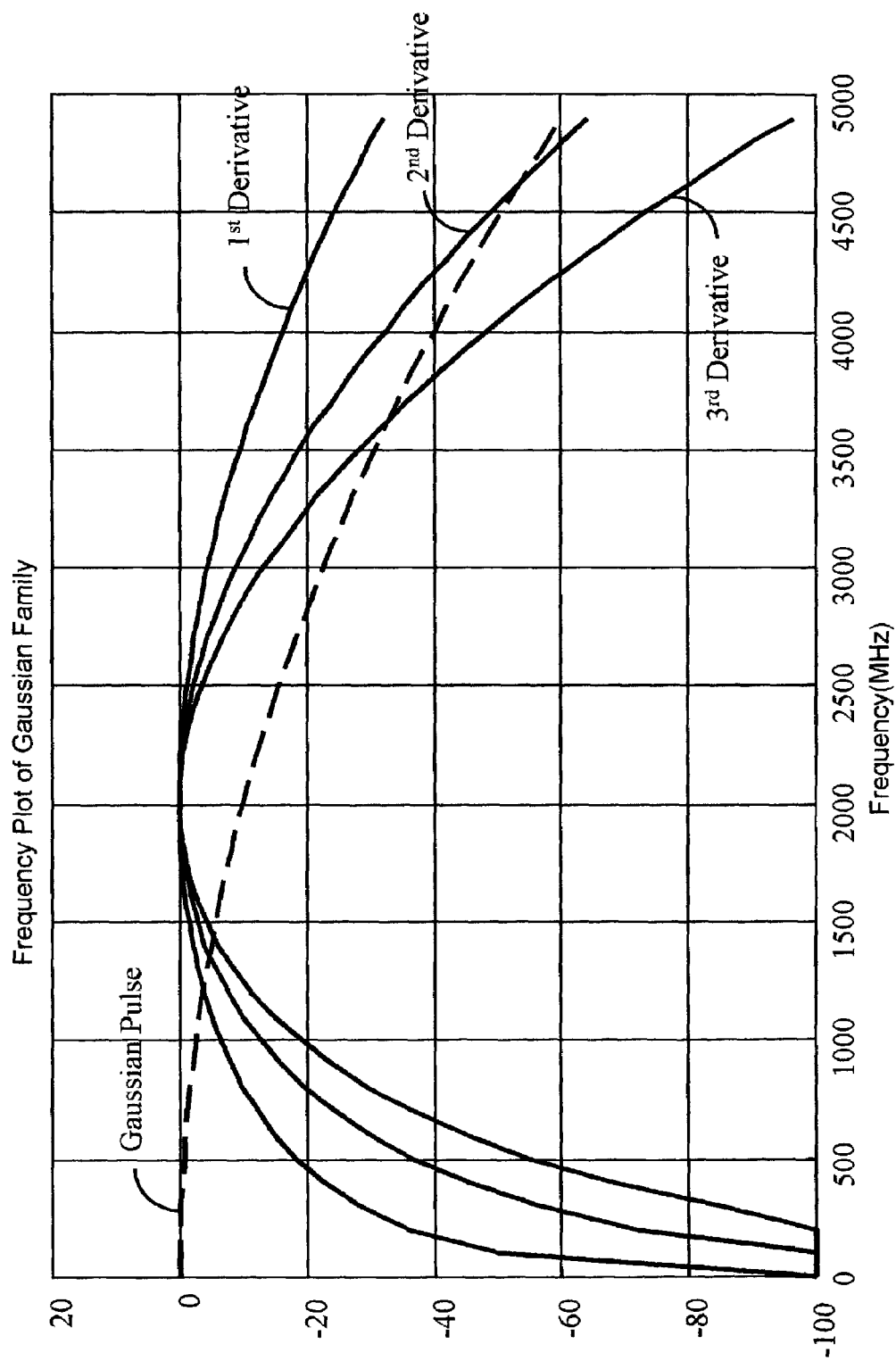
FIG. 1F depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (j(2\pi))^{\frac{3}{2}}\sqrt{e}\,\sigma^2 f e^{-2(\pi\sigma f)^2}$$

The center frequency ($f_c$), or frequency of peak spectral density, of the Gaussian monocycle is:

$$f_c = \frac{1}{2\pi\sigma}$$

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = a \sum_{i=1}^{n} w(c(t - iT_f), b)$$

where i is the index of a pulse within a pulse train of n pulses, a is pulse amplitude, b is pulse type, c is a pulse width scaling parameter, w(t, b) is the normalized pulse waveform and $T_f$ is pulse repetition time, also referred to as frame time.

The Fourier transform of a pulse train signal over a frequency bandwidth of interest may be determined by summing the phasors of the pulses for each code time shift, and multiplying by the Fourier transform of the pulse function:

$$S(f) = a \left| \sum_{i=1}^{n} e^{-j2\pi f i T_f} \right| W(f)$$

where S(f) is the amplitude of the spectral response at a given frequency, f is the frequency being analyzed, $T_f$ is the relative time delay of each pulse from the start of time period, W(f) is the Fourier transform of the pulse, w(t,b), and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-peak-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Specialized coding techniques can be employed to specify temporal and/or non-temporal pulse characteristics to produce a pulse train having certain spectral and/or correlation properties. For example, by employing a Pseudo-Noise (PN) code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
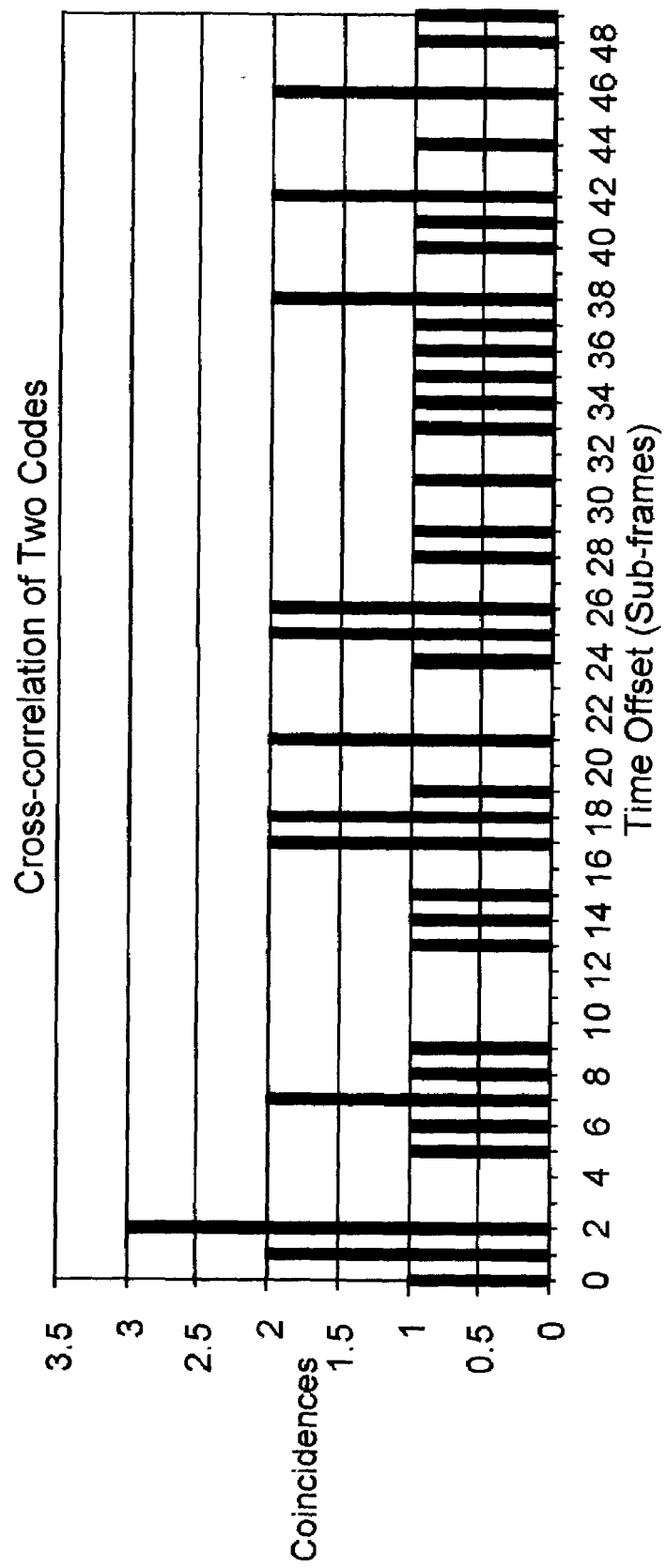
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}(t) = \sum_{i} (-1)^{f_i} a_i w(c_i(t - T_i), b_i)$$

where $s_{tr}(t)$ is the coded pulse train signal, i is the index of a pulse within the pulse train, $(-1)^{f_i}$, $a_i$, $b_i$, $c_i$, and $\omega(t,b_i)$ are the coded polarity, pulse amplitude, pulse type, pulse width, and normalized pulse waveform of the i'th pulse, and $T_i$ is the coded time shift of the i'th pulse Various numerical code generation methods can be employed to produce codes having certain correlation and spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A generalized expression for a pulse train with 'early-late' time-shift modulation over a data symbol time is:

$$s_{tr}(t) = \sum_{i=1}^{N_s} (-1)^{f_i} a_i w(c_i(t - T_i - \delta d_k), b_i)$$

where k is the index of a data symbol (e.g., bit), i is the index of a pulse within the data symbol, $N_s$ is the number of pulses per symbol, $(-1)^{f_i}$ is a coded polarity (flipping) pattern (sequence), $a_i$ is a coded amplitude pattern, $b_i$ is a coded pulse type (shape) pattern, $c_i$ is a coded pulse width pattern, and $w(t,b_i)$ is a normalized pulse waveform of the i'th pulse, $T_i^j$ is the coded time shift of the i'th pulse, $\delta$ is the time shift added when the transmitted symbol is 1 (instead of 0), $d_k$ is the data (i.e., 0 or 1) transmitted by the transmitter. In this example, the data value is held constant over the symbol interval. Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Ser. No. 60/209,857, filed Jun. 7, 2000, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they typically do not depend on receiving every transmitted pulse. Except for single pulse per bit systems, impulse radio receivers perform a correlating, synchronous receiving function (at the RF level) that uses sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
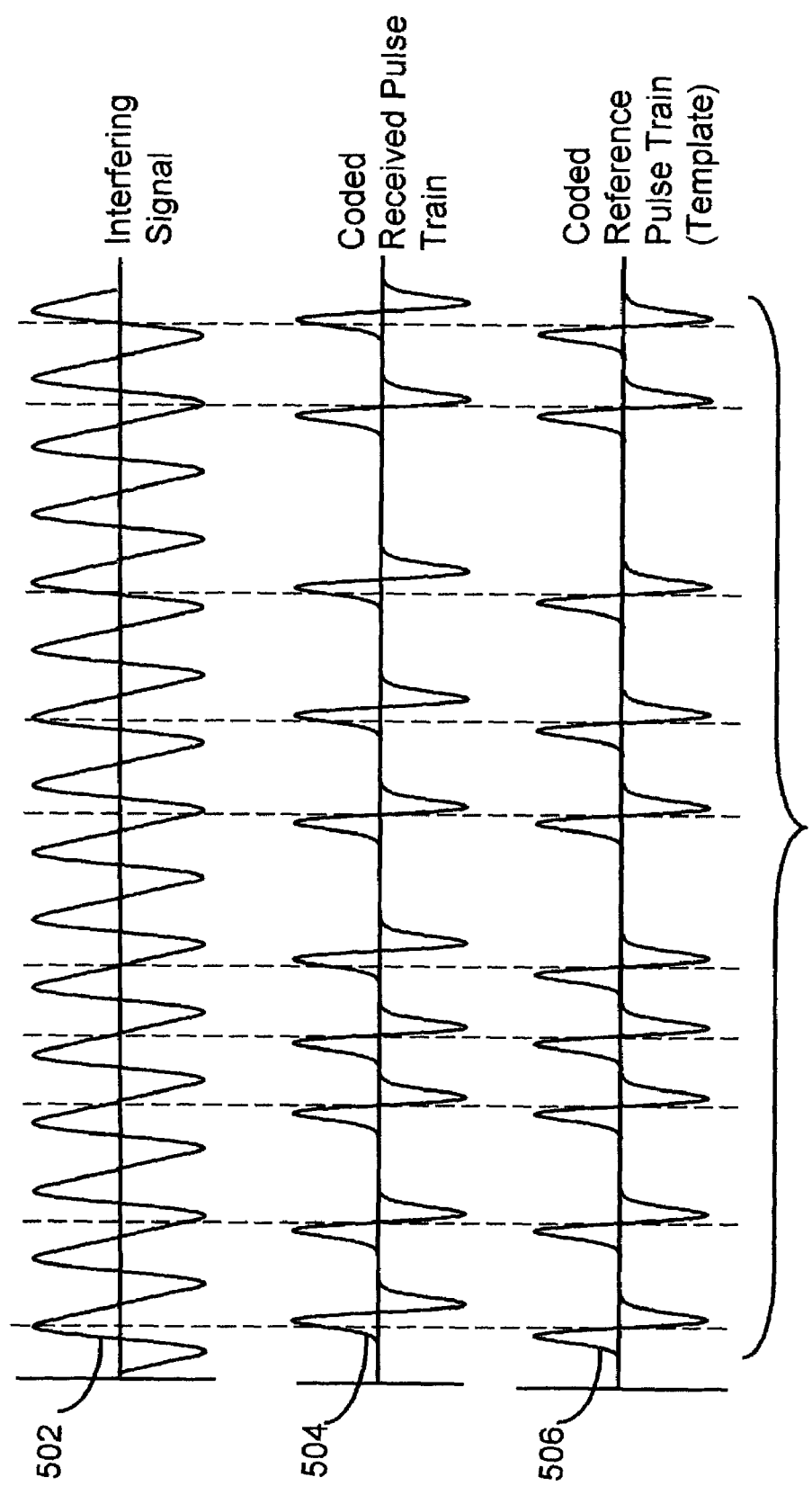
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a conventional narrow band direct sequence spread spectrum system with a 10 kbps data rate and a 10 MHz spread bandwidth yields a processing gain of 1000, or 30 dB. However, far greater processing gains are achieved by impulse radio systems, where the same 10 kbps data rate is spread across a much greater 2 GHz spread bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of a reference impulse radio receiver may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_1$ is the received amplitude of the desired transmitter, $A_k$ is the received amplitude of interfering transmitter k's signal at the reference receiver, and $\sigma_{rec}^2$ is the variance of the receiver noise component at the pulse train integrator output in the absence of an interfering transmitter. The waveform-dependent parameters $m_p$ and $\sigma_a^2$ are given by $$m_p = \int_{-\infty}^{\infty} \omega(t)[\omega(t) - \omega(t-\delta)]\,dt \text{ and}$$

$$\sigma_a^2 = T_f^{-1} \int_{-\infty}^{\infty} \left[\int_{-\infty}^{\infty} \omega(t-s)\upsilon(t)dt\right]^2 ds,$$

where $\omega(t)$ is the transmitted waveform, $\upsilon(t)=\omega(t)-\omega(t-\delta)$ is the template signal waveform, $\delta$ is the modulation time shift between a digital one and a zero value data bit, $T_f$ is the pulse repetition time, or frame time, and s is an integration parameter. Further details of this analysis can be found in R. A. Scholtz, "Multiple Access with Time-Hopping Impulse Modulation," Proc. MILCOM, Boston, Mass., Oct. 11–14, 1993.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents a substantial portion of the potential coverage area of a typical radio system. In a mobile system, received signal strength fluctuates due to the changing mix of multipath signals that vary as the mobile units position varies relative to fixed transmitters, other mobile transmitters and signal-reflecting surfaces in the environment.

Figure 5B:
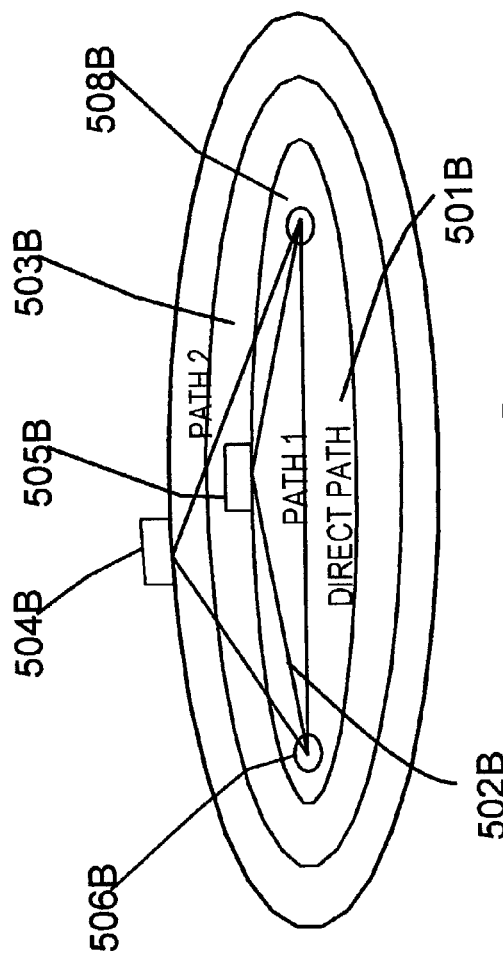
FIG. 5B depicts a typical geometrical configuration giving rise to multipath received signals.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path 2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

Figure 5C:
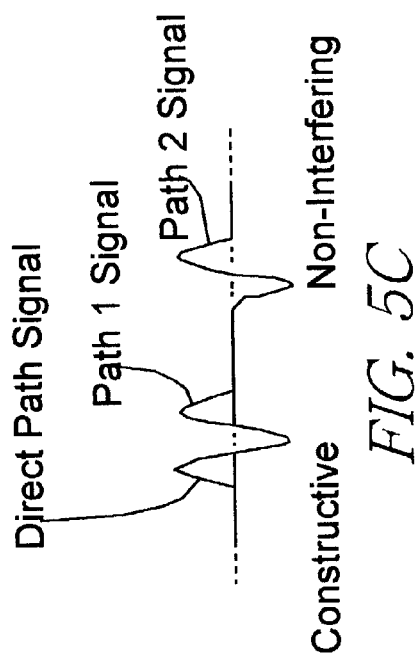
FIG. 5C illustrates exemplary multipath signals in the time domain.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 5D:
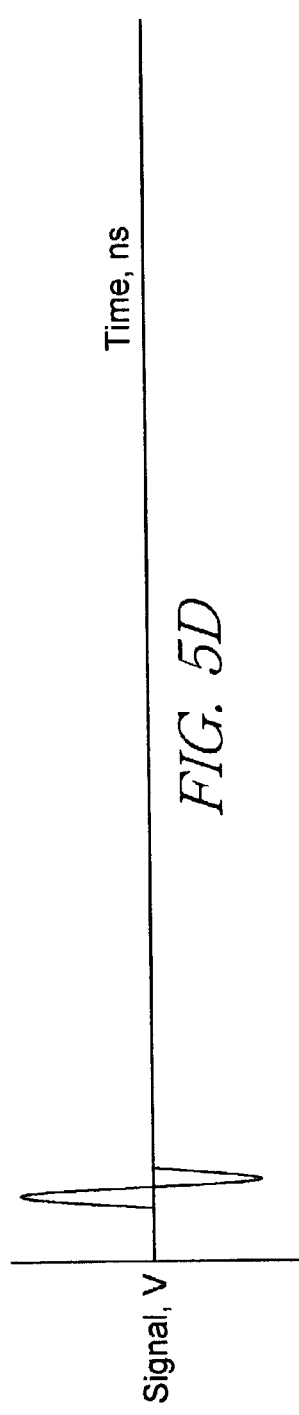
FIGS. 5D–5F illustrate a signal plot of various multipath environments.
Figure 5E:
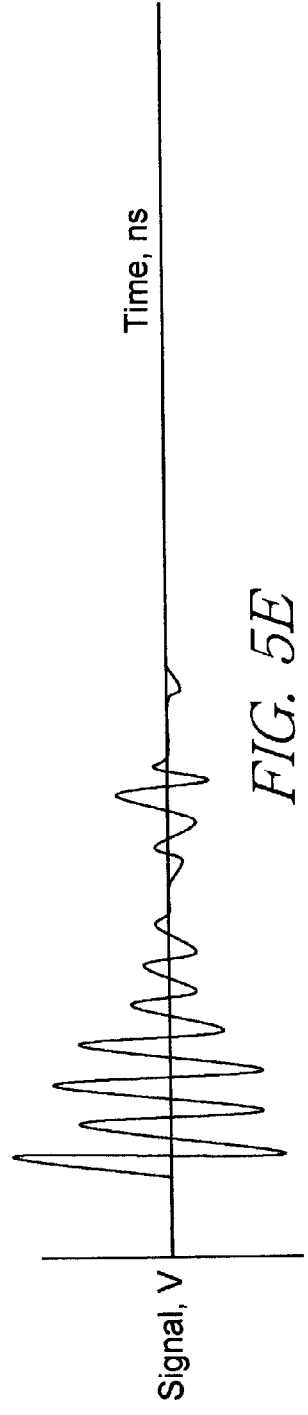
Figure 5F:
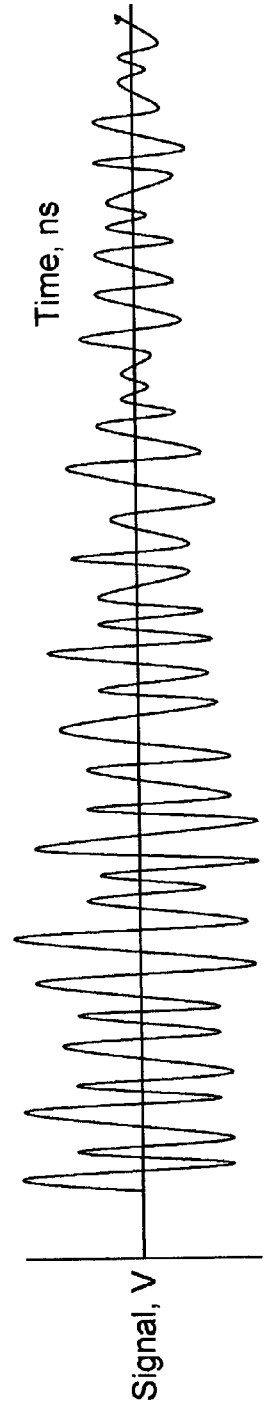

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Figure 5G:
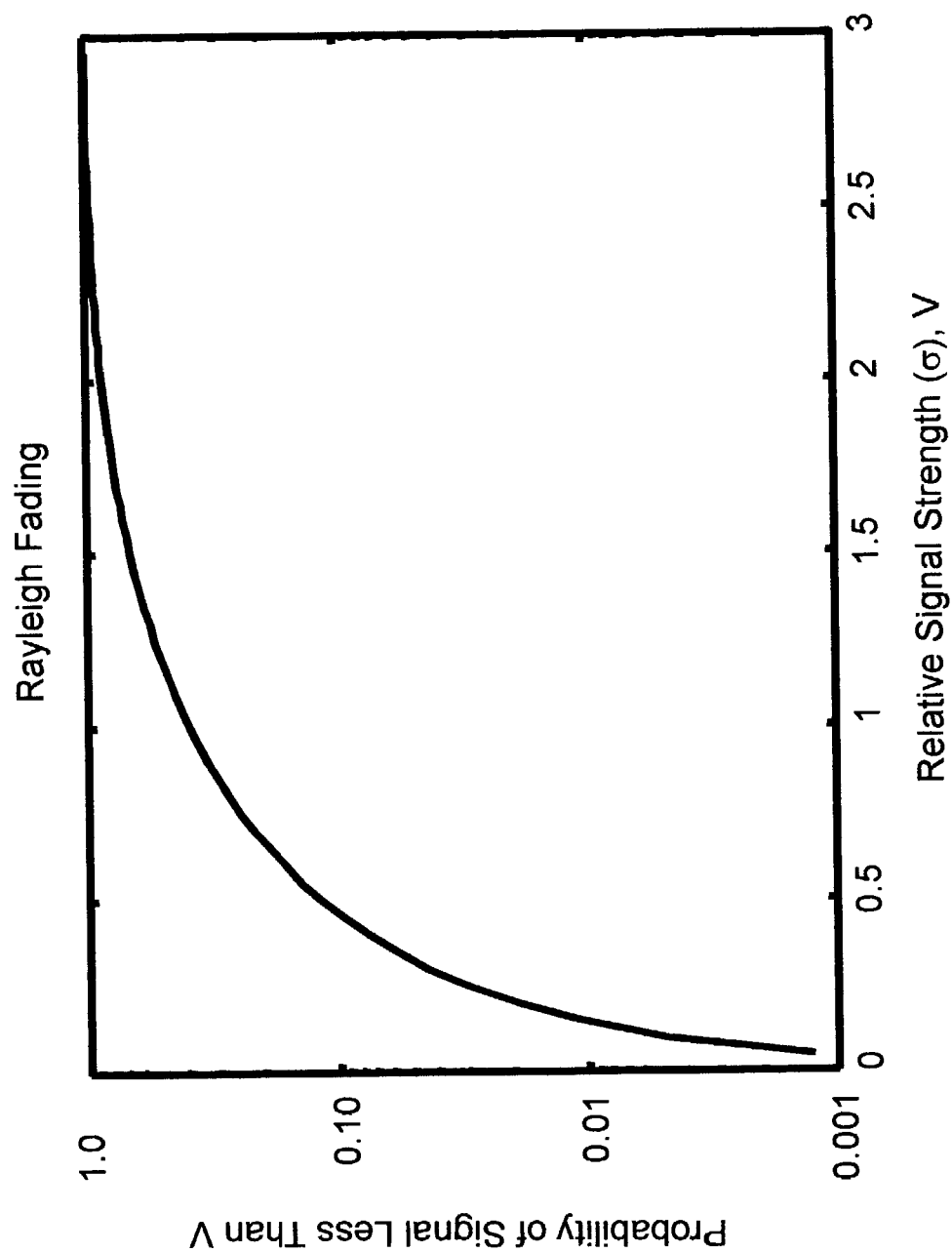
FIG. 5G illustrates the Rayleigh fading curve associated with non-impulse radio transmissions in a multipath environment.

In a narrow band system subject to a large number of multipath reflections within a symbol (bit) time, the received signal is essentially a sum of a large number of sine waves of random amplitude and phase. In the idealized limit, the resulting envelope amplitude has been shown to follow a Rayleigh probability density as follows:

$$p(r) = \frac{r}{\sigma^2} \exp\left(\frac{-r^2}{2\sigma^2}\right)$$

where r is the envelope amplitude of the combined multipath signals, and $2\sigma^2$ is the expected value of the envelope power of the combined multipath signals. The Rayleigh distribution curve in FIG. 5G shows that 10% of the time, the signal is more than 10 dB attenuated. This suggests that a 10 dB fade margin is needed to provide 90% link reliability. Values of fade margin from 10 dB to 40 dB have been suggested for various narrow band systems, depending on the required reliability. Although multipath fading can be partially improved by such techniques as antenna and frequency diversity, these techniques result in additional complexity and cost.

Figure 5H:
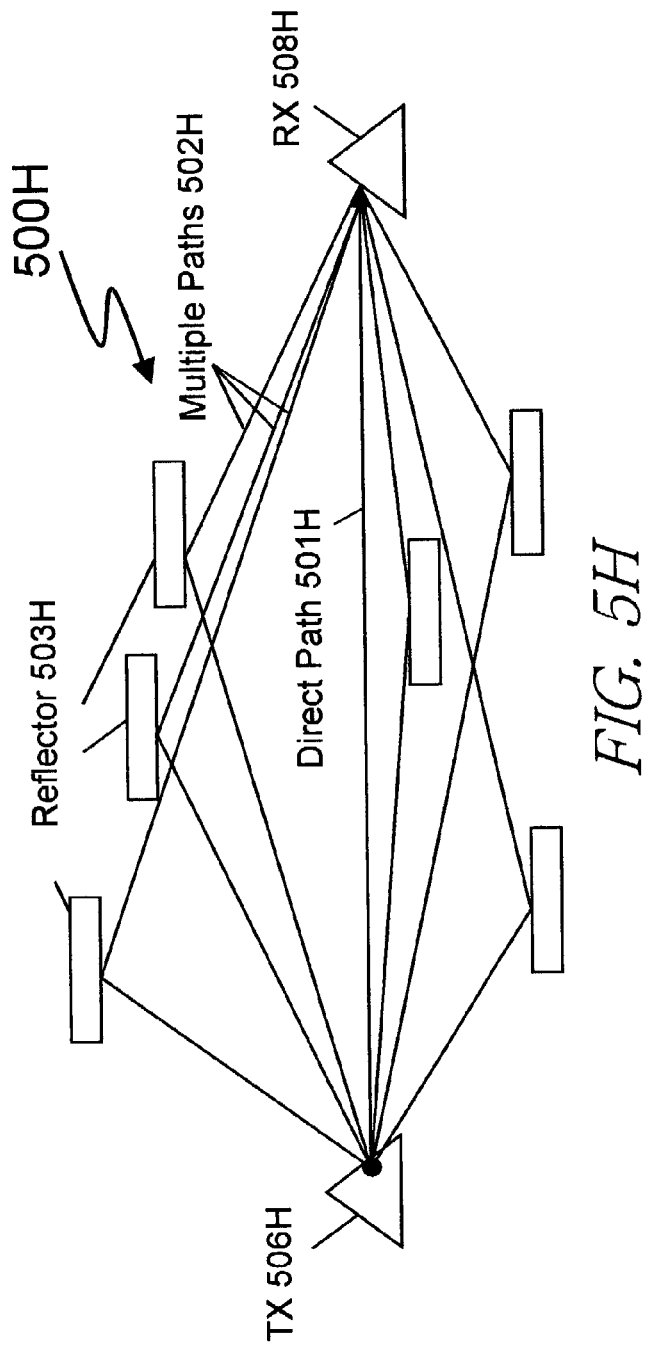
FIG. 5H illustrates a plurality of multipaths with a plurality of reflectors from a transmitter to a receiver.
Figure 5I:
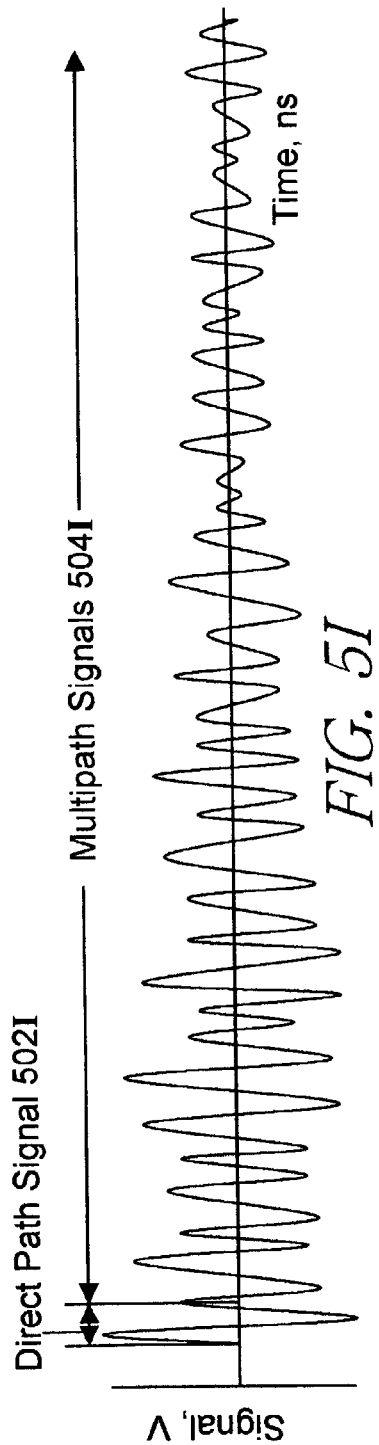
FIG. 5I graphically represents signal strength as volts vs. time in a direct path and multipath environment.

In a high multipath environment such as inside homes, offices, warehouses, automobiles, trailers, shipping containers, or outside in an urban canyon or in other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off of reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. UWB system can thus resolve the reflections into separate time intervals which can be received separately. Thus, the UWB system can select the strongest or otherwise most desirable reflection from among the numerous reflections. This yields a multipath diversity mechanism with numerous paths making it highly resistant to Rayleigh fading. Whereas, in a narrow band systems, the reflections arrive within the minimum time resolution of one bit or symbol time which results in a single vector summation of the delayed signals with no inherent diversity.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has minimal multi-cycle ambiguity, it is feasible to determine waveform position to less than a wavelength in the presence of noise. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology in a Time Division Multiple Access (TDMA) radio system can achieve geo-positioning capabilities to high accuracy and fine resolution. This geo-positioning method is described in co-owned, co-pending application titled "System and Method for Person or Object Position Location Utilizing Impulse Radio," application Ser. No. 09/456,409, filed Dec. 8, 1999, and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another.

Reducing the transmitter power of each radio to a level that produces satisfactory reception increases the total number of radios that can operate in an area without mutual interference.

For greater elaboration of impulse radio power control, see patent application titled "System and Method for Impulse Radio Power Control," application Ser. No. 09/332,501, filed Jun. 14, 1999, assigned to the assignee of the present invention, and incorporated herein by reference.

Exemplary Transceiver Implementation

Transmitter

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter. The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses (also called the emitted signal) propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

{tc \l2 "II.2. Receiver} An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 may be coupled to an optional subcarrier demodulator 732, which demodulates the subcarrier information signal from the optional subcarrier, when used. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to maintain proper timing between between the received signal 708 and the template. The loop error signal 744 is processed by the loop filter to provide adjustments to the adjustable time base 718 to correct the relative time position of the periodic timing signal 726 for best reception of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference.

DETAILED DESCRIPTION OF THE INVENTION

Figure 9:
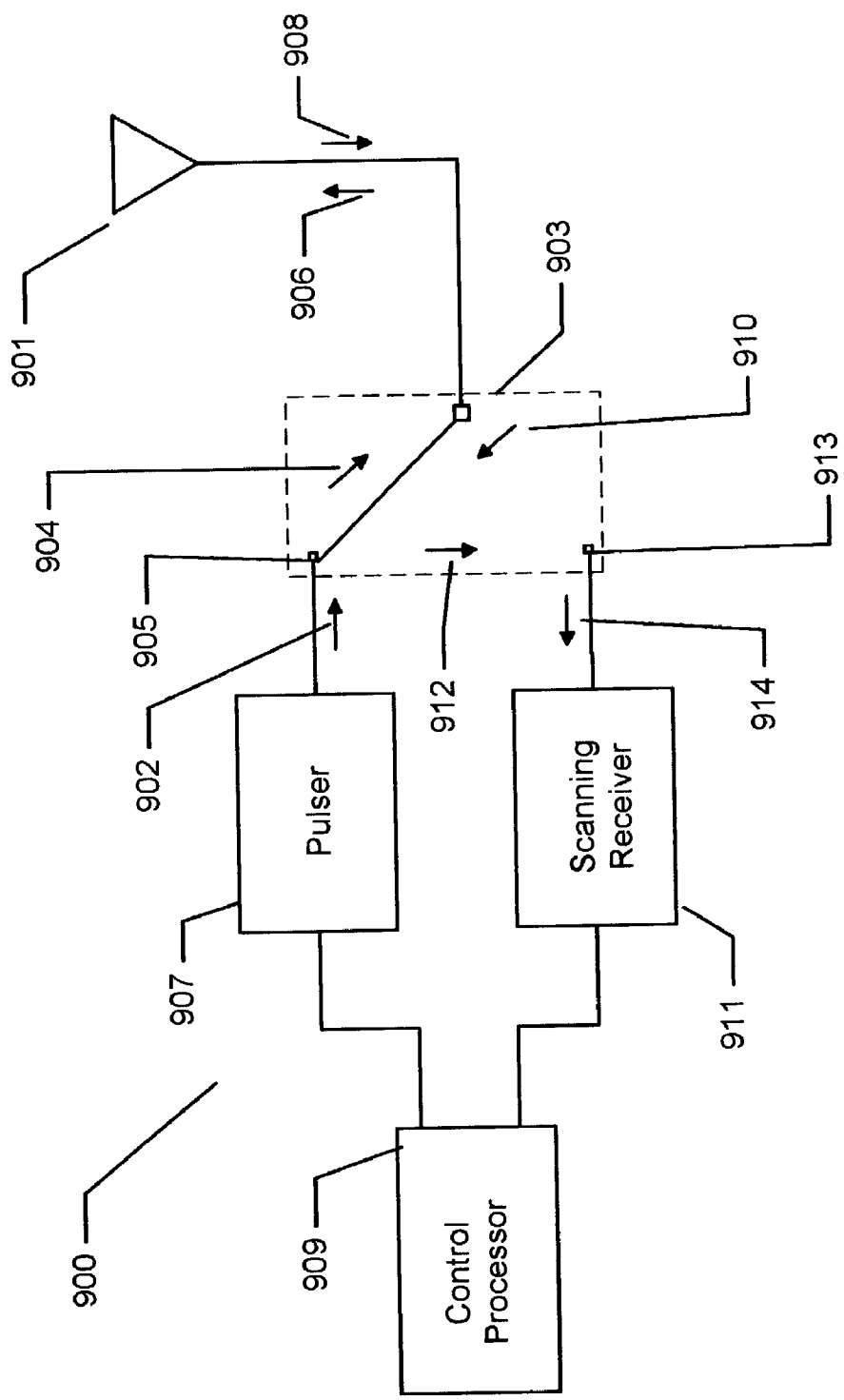
FIG. 9 is a functional diagram of an impulse radio transceiver in accordance with the present invention.

FIG. 9 is a functional diagram of an impulse radio transceiver 900. Transceiver 900 comprises a control processor 909 outputting to and providing control for, inter alia, pulser 907. Pulser 907 generates pulses to be transmitted by transceiver 900. A transmit/receive (T/R) switch 903 coupled to pulser 907. As with any transceiver, when T/R switch 903 is in the "transmit" position 905, coupling between pulser and antenna 901 is enabled. Coupled to the "receive" position 913 of T/R switch 903 is a scanning receiver such as that described in co-owned and co-pending application Ser. No. 09/537,264, filed Mar. 29, 2000 referenced above. However, it should be noted that a receiver capable of receiving and yielding as output the time domain dependence of received waveforms will be within the scope of the present invention. Such receivers could be scanning or sampling receivers as those terms are known in the art. Although not shown, control processor 909 also provides timing source for scanning receiver 911 and for T/R switch 903 as would be apparent to those skilled in the art with the benefit of this description.

In operation, pulser 907 sends a signal along transmit path 902, through the "transmit" position 905 along the transmit path 904 of T/R switch 903. However, not all energy from the signal is conducted along the transmit path 904. Some energy discharges, or leaks, from the transmit position 905 to the receive position 913 along discharge path 912. This discharged energy is capable of being detected by scanning receiver 911.

Furthermore, not all energy that is conducted through T/R switch 903 to antenna 901 along antenna transmit path 906 is converted by antenna 901. Some energy is reflected by antenna 901 via reflected path 908 to switch 903 and via reflected path 910 to transmit position 905. Again, some of this reflected energy is discharged from the transmit position 905 to receive position 913 along discharge path 912 and is capable of being detected by scanning receiver 911.

Figure 10:
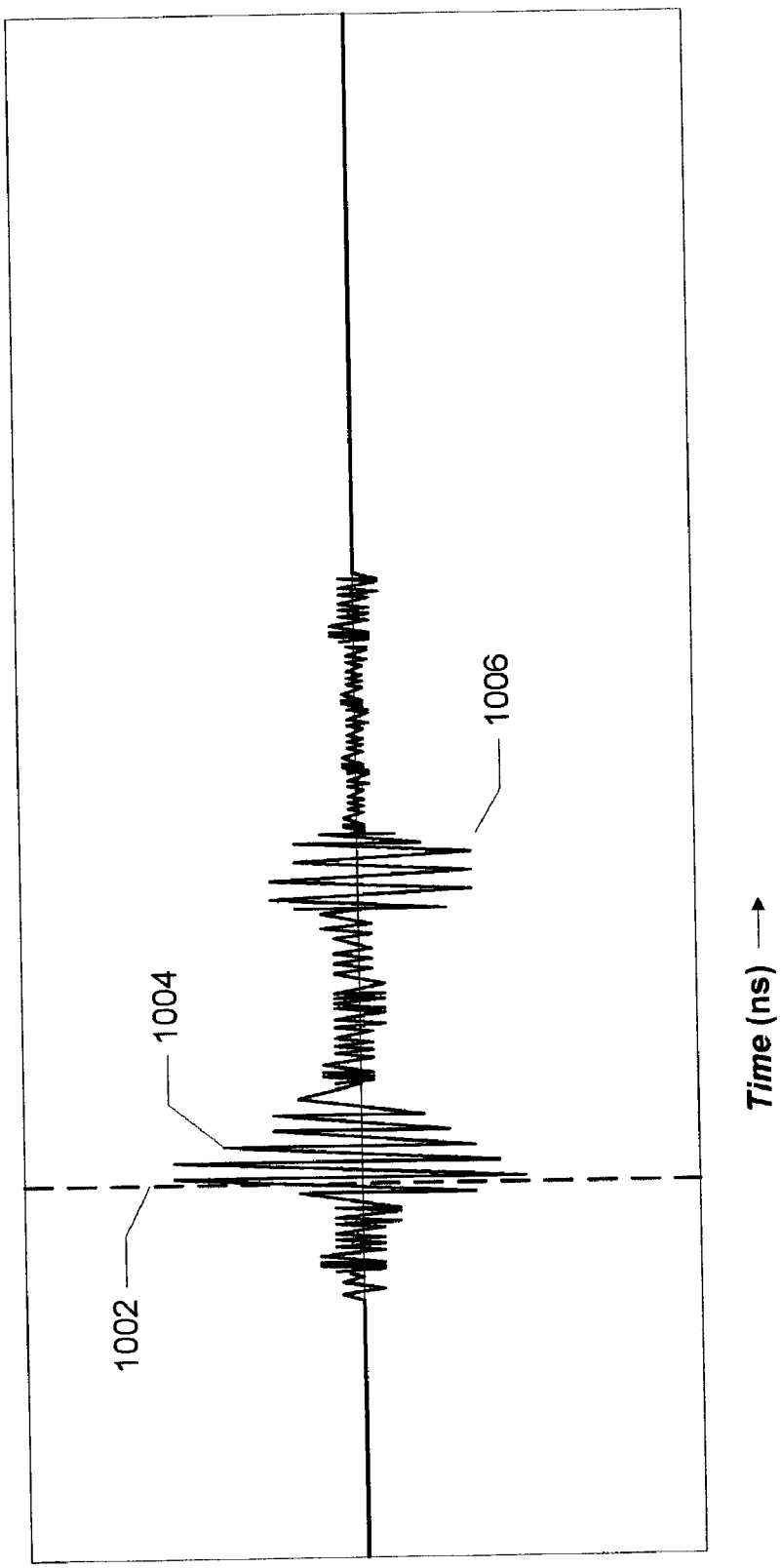
FIG. 10 illustrates a time domain scan of received impulse signals.

FIG. 10 depicts a time domain representation of a waveform received from leakage across T/R switch 903 as a result of a transmission event generated from pulser 907. FIG. 10 is representative of what scanning receiver 911 would "see" as a result of the operation described above. As shown, the earlier received energy "un-reflected energy" 1004 shows that portion of the signal that discharges from transmit position 905 of T/R switch 903 along path 912 without reflecting from antenna 901. The later received energy, or "reflected energy" 1006 shows that portion of the signal which continues through T/R switch 903 along transmit path 904 and is reflected from antenna 901 back via return path 908 and finally leaking from transmit position 905 of switch along path 912. Since reflected energy 1006 has a slightly longer distance to travel, it is received at a slightly later time than un-reflected energy 1004.

It should be noted that in operation scanning receiver 911 has detected recognizable returns, i.e. pulsed energy as opposed to internal noise, with as much as 60 db attenuation across the positions of T/R switch 903.

To calculate the distance traveled by the pulse signal, it is necessary to find the time of arrival of returned energy at the receiver. This assumes a system in which the timing functions of transmit and receive operations have a common timing source, such as control processor 909. There are many methods known in the art for determining signal time of arrival that would be encompassed by the present method. In one embodiment of the present invention, the time of arrival of the un-reflected energy 1004 is found. This can be accomplished by using a leading edge search, such as that described in co-owned and co-pending application Ser. No. 09/915,891, filed Jul. 26, 2001, and incorporated by reference herein. The leading edge search algorithm determines the time of arrival of the leading edge 1002 of un-reflected energy 1004.

Determination of the time of arrival of un-reflected energy 1004 allows the determination of time of arrival of reflected energy 1006. This is because when viewing the scan of FIG. 10 as a receiver would "see" it, the system may be programmed to identify the first-received energy that is capable of being distinguished from noise as un-reflected energy 1004 since un-reflected energy 1004 has less distance to travel through the circuitry. The receiver may then identify the second-received energy capable of being distinguished from noise as reflected energy 1006, as reflected energy 1006 has traveled a farther distance within the system.

Once the time of arrival of un-reflected energy 1004 is found, the time of arrival of reflected energy 1006 may be determined. A leading edge algorithm described above may again be used to find the leading edge of the reflected energy 1006 once reflected energy 1006 is identified. Another method to find the time of arrival of reflected energy 1006 is to calculate the difference between the times of arrival of un-reflected energy 1004 and reflected energy 1006 and add the difference to the time of arrival of un-reflected energy 1004.

Figure 11:
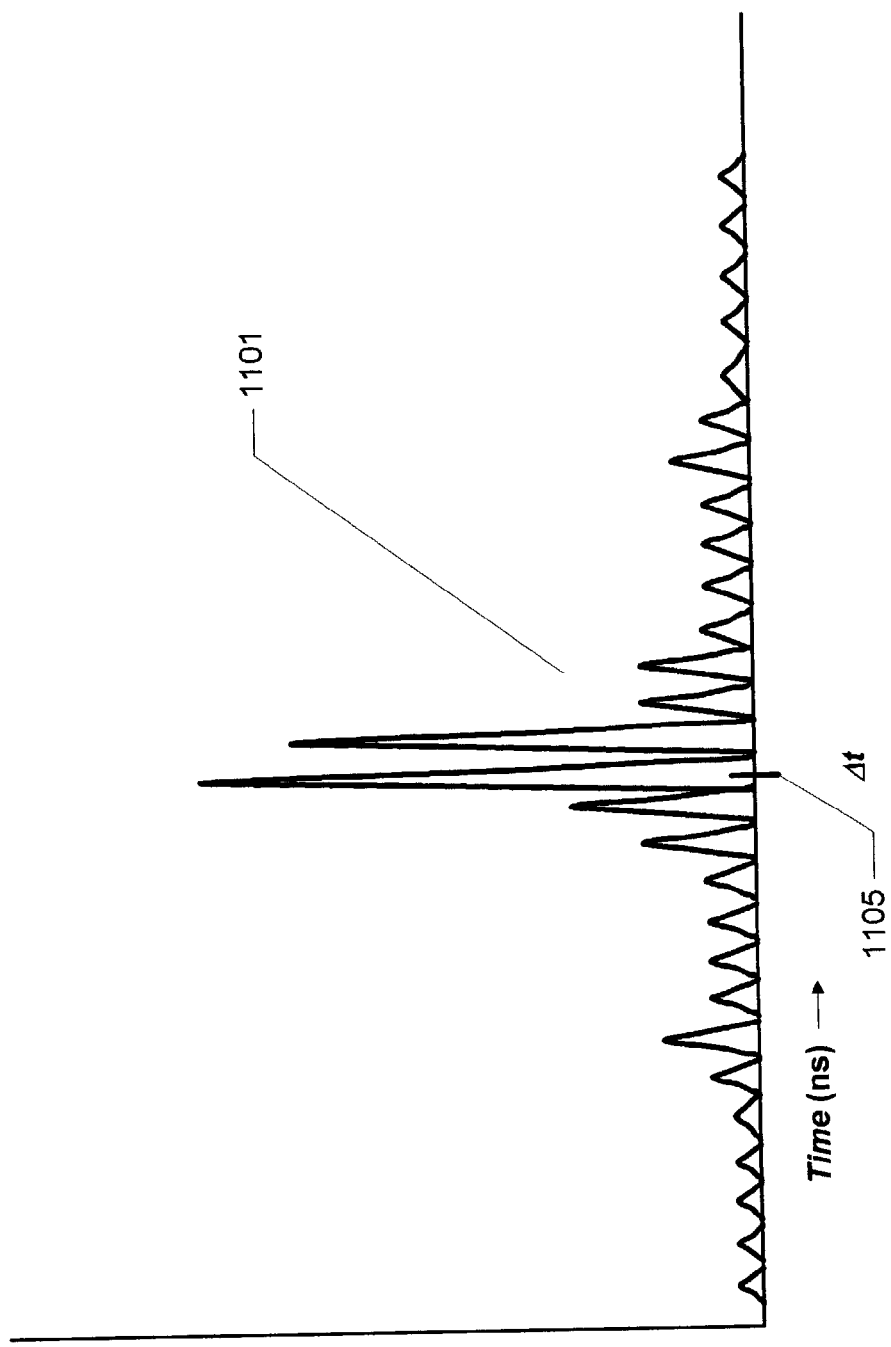
FIG. 11 represents a time domain plot of an auto-correlation function of a time domain scan of received impulse signals.

Referring now to FIG. 11, the difference in times of arrival, $\Delta t$ 1105, may be found by performing an auto-correlation of the composite waveform. FIG. 11 is a representation of an auto-correlation plot 1101, showing that the maximum of the function occurs at $\Delta t$ 1105. As suggested above, the time arrival of reflected energy 1006 is then found by adding $\Delta t$ 1105 to leading edge 1002 of un-reflected energy 1004. The final step is to convert the time of arrival into distance. The conversion may be performed by control processor 909 with appropriate programming. The distance thus calculated may be stored and added to calculations of distance between, or among, transceivers thereby enhancing the accuracy of those measurements. In addition, the method may be performed periodically throughout operation of transceiver 900 to re-calibrate transceiver 900 to account for differences in distance measurements resulting from temperature variations as transceiver 900 circuitry warms up.

As described above, many features of the present invention can be performed and/or controlled by a control processor 909, which in effect comprises a computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCM-CIA slot and card, etc. Software and data transferred via the communications interface are in the form of signals that can be electronic, electromagnetic, optical or other signals capable of being received by the communications interface. These signals are provided to the communications interface via a channel that can be implemented using wire or cable, fiber optics, a phone line, a cellular phone link, an RF link, and the like.

In this document, the terms "computer program medium" and "computer usable medium" are used to generally refer to media such as removable storage device, a removable memory chip (such as an EPROM, or PROM) within a transceiver, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a transceiver.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s). In yet another embodiment, features of the invention can be implemented using a combination of both hardware and software.

As described above and shown in the associated drawings, the present invention comprises a system and method for calibrating an impulse radio transceiver. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method for calibrating an impulse radio distance measuring system, said distance measuring system comprising an impulse radio transceiver, comprising the steps of:
   a. switching a transmit/receive switch to a transmit position;
   b. transmitting an un-reflected pulse through said switch to an antenna;
   c. receiving said un-reflected pulse coupled through said switch as leakage energy while said switch is in said transmit position;
   d. receiving a reflected pulse resulting from said un-reflected pulse reflecting from said antenna; said reflected pulse coupled through said switch as leakage energy while said switch is in said transmit position;
   e. determining a difference between times of arrival of said un-reflected pulse and said reflected pulse; and
   f. calibrating said distance measuring system based on said difference between times of arrival.

2. The method of claim 1, wherein the step of determining a difference between times of arrival comprises the steps of:
   measuring a first time of arrival of said reflected pulse to produce a first measurement;
   measuring a second time of arrival of said un-reflected pulse to produce a second measurement; and
   determining a difference between said first measurement and said second measurement to yield said difference between times of arrival.

3. The method of claim 1, wherein the calibrating step comprises the step of:
   converting said difference between times of arrival to a distance.

4. The method of claim 2, wherein said step of measuring a second time of arrival comprises finding an occurrence of a leading energy excursion of said un-reflected pulse.

5. The method of claim 1, wherein the step of determining a difference between times of arrival comprises the step of:
   measuring said difference between times of arrival of said un-reflected pulse and said reflected pulse by using autocorrelation.

6. An impulse radio transceiver apparatus for calibrating an impulse radio distance measuring system comprising:
   a. a pulser configured to generate pulses having an ultra wideband frequency characteristic;
   b. a transmit/receive switching means coupled to said pulser, said transmit/receive switching means having a transmit position;
   c. an antenna means operatively coupled to said switching means;
   d. a scanning receiver responsive to said switching means;
   e. a control processor having at least one input, said at least one input being coupled to said scanning receiver, said control processor being adapted to determine times of arrival of a leakage energy resulting from an un-reflected pulse being transmitted through said transmit/receive switching means to said antenna means, said leakage energy resulting from said un-reflected pulse being discharged from said transmit position to said receive position along a discharge path as leakage energy while said transmit/receive switching means is in said transmit position and a reflected pulse resulting from said un-reflected pulse reflecting from said antenna means being coupled through said transmit/receive switching means as leakage energy while said transmit/receive switching means is in said transmit position, to convert said times of arrival into a distance, and to use said distance to calibrate said impulse radio distance measuring system.

7. The impulse radio transceiver apparatus of claim 6, wherein said control processor is adapted to determine said times of arrival by finding a leading edge of said un-reflected pulse.

8. The impulse radio transceiver apparatus of claim 7, wherein said control processor is adapted to determine said times of arrival by measuring a time differential between arrival of said reflected pulse and said un-reflected pulse.

9. The impulse radio transceiver apparatus of claim 8, wherein said time differential is measured by auto-correlation.

10. A method for calibrating an impulse radio distance measuring system, said distance measuring system comprising an impulse radio transceiver, comprising the steps of:
    a. switching a transmit/receive switch to a transmit position;
    b. transmitting an un-reflected pulse through said transmit/receive switch to an antenna; and
    c. determining times of arrival of a leakage energy resulting from said un-reflected pulse being coupled through said transmit/receive switch as leakage energy while said transmit/receive switch is in said transmit position and a reflected pulse resulting from said un-reflected pulse reflecting from said antenna being coupled through said transmit/receive switch as leakage energy while said transmit/receive switch is in said transmit position.

11. The method of claim 10, wherein said step of determining said times of arrival comprises determining a first time of arrival, said first time of arrival being the time of arrival of said un-reflected pulse.

12. The method of claim 11, wherein said step of determining said times of arrival comprises determining a second time of arrival of said reflected pulse and determining a differential time, said differential time being the difference in time of the arrivals of said un-reflected pulse and said reflected pulse.

13. The method of claim 12, further comprising the step of:
    d. converting said times of arrival into a distance.

* * * * *